United States Patent Office.

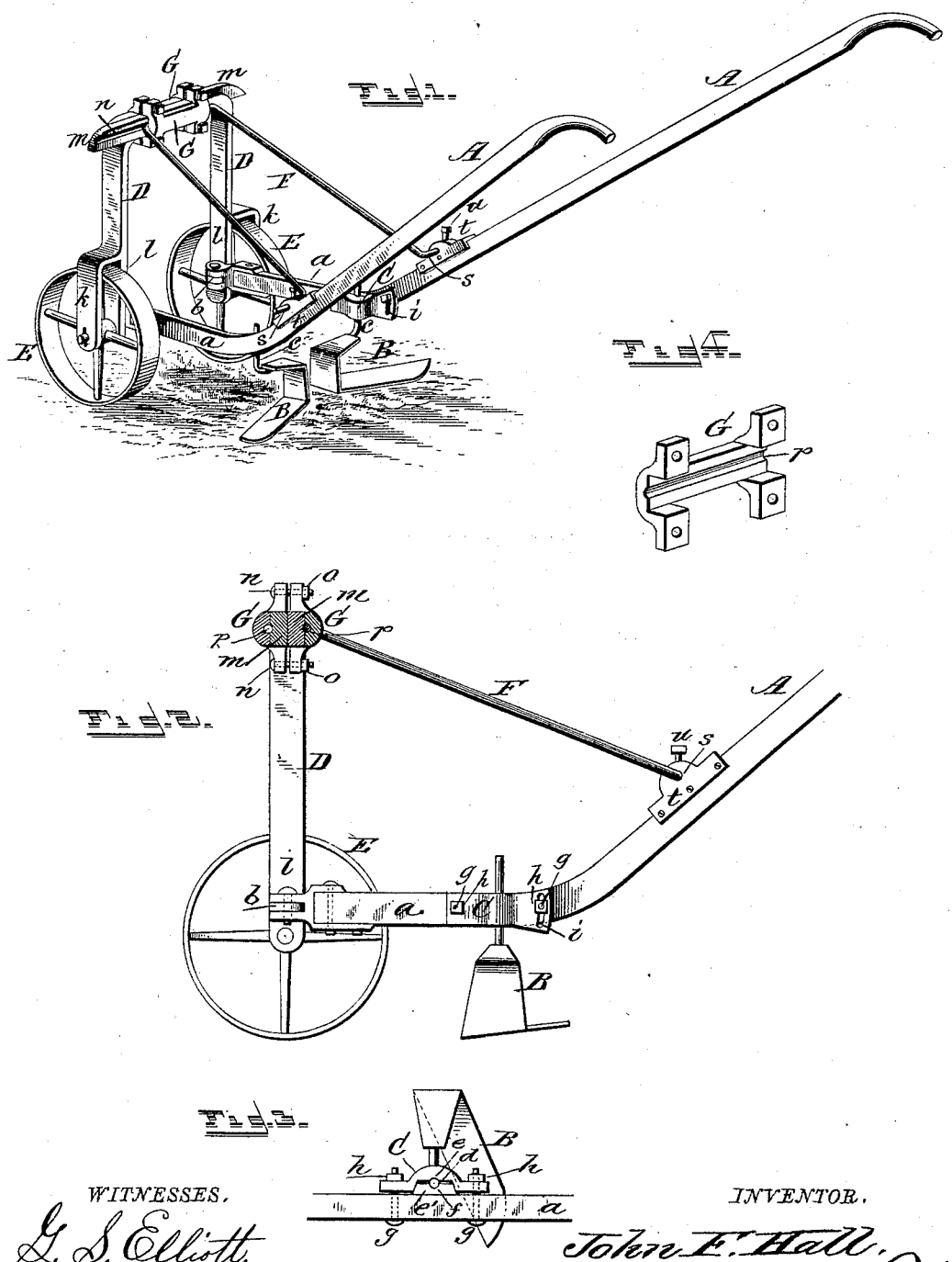

JOHN F. HALL, OF MOLINE, ILLINOIS.

WHEEL-CULTIVATOR.

SPECIFICATION forming part of Letters Patent No. 392,728, dated November 13, 1888.

Application filed June 30, 1888. Serial No. 278,612. (No model.)

*To all whom it may concern:*

Be it known that I, JOHN F. HALL, a citizen of the United States, residing at Moline, in the county of Rock Island and State of Illinois, have invented certain new and useful Improvements in Wheel-Cultivators; and I do hereby declare that the following is a full, clear, and exact description of the same, reference being had to the annexed drawings, making a part of this specification, and to the letters and figures of reference marked thereon.

Figure 1 of the drawings is a perspective view of my improved cultivator; Fig. 2, a longitudinal central section thereof; Fig. 3, a detail view of one of the knives, showing the manner of attaching it to the beam; and Fig. 4, a detail view in perspective of one of the clamps for holding the extensible arched axle-tree together.

The present invention has relation to that class of two-wheeled cultivators especially adapted for use in gardens, to take the place of the garden-hoe usually employed.

The object of the invention is to provide a simple and easily-operating cultivator of the class above referred to that will do the work more expeditiously and more satisfactorily than the ordinary hoe heretofore in use; and it consists in the several details of construction, substantially as shown in the drawings and hereinafter described and claimed.

In the accompanying drawings, A represents the usual handles of the cultivator, which terminate in the beams $a$, thus forming the handles and beams in one and a single piece. The beams $a$ at their forward ends are hinged in any well-known manner to the arched axle, as shown at $b$, whereby said beams and handles can be moved laterally, as desired. To the beams $a$ are connected suitable knives, B; or plows or any other form of tool may be substituted, as circumstances require, the shanks $c$ of the knives being held to the beams by the boxes C, said boxes being recessed at $d$, and having semicircular seats $e$ for the shanks of the knives or plows.

Within the recesses $d$ of the boxes C fit blocks $e'$, said recesses and blocks being slightly tapering, so as to take up any wear by the usual friction incident to a bearing-surface, and thereby making a rigid connection for the shanks of the knives or plows. The blocks $e'$, as will be noticed, have semicircular seats $f$, similar to those of the boxes, which together form a seat for the shank. These grooves or seats on the boxes and blocks may be of any form, so as to correspond to the form of the shank of the knives, plows, or other tool used.

The boxes C are firmly held to the beams $a$, and drawn up tightly against the shanks of the knives or plows to hold them rigid by means of the screw-bolts $g$ and nuts $h$, as shown in Fig. 3. The grooves or seats for the shanks are made slightly smaller than the diameter of the shanks, whereby the box, when screwed up, works as a vise or clamp to hold the shanks. By means of the construction shown and herein described for holding the knives or shovels to the beams the latter are enabled to be adjusted vertically to regulate its depth in the ground.

The boxes C at their rear ends have slots $i$, through which one of the fastening-bolts passes, thereby enabling the knives or shovels to be set at any desired pitch to the ground.

The arched axle consists of the two sections D, terminating at their lower ends in double arms $k\ l$, between which the wheels E are located and have their bearings, the upper extremity of the sections having inwardly and horizontally extending arms $m$, provided with semicircular grooves $n$ upon their outer sides to form a seat for the end or ends of the spring F. The horizontally-extending arms $m$ of the arched-axle sections are held together by means of clamps G and bolts $n$ and nuts $o$, one or both of said clamps having longitudinal grooves $p$, to correspond with the grooves in the arms $m$, which form together a seat for the spring of slightly less diameter than the rod, so that the spring will be tightly held between the clamps when the latter are screwed up tightly against the arms of the arched-axle sections.

By the employment of the clamps G, and making the arched axle in sections, as described, the cultivator can be adjusted to any desired width, as necessity demands, by the extensibility of the arched-axle sections, and held in their adjusted or extended position by the clamps, as hereinbefore described.

The spring F may be constructed of a spring rod or rods, $r$, which have their lower ends bent outwardly, as shown at $s$, and are held to brackets *t* upon the handles or beams of the cultivator by means of set-screws *u*.

The spring-rods form together braces between the handles and arched axle, and also bring the handles back to their normal position when expanded laterally or swung to one side, and provision is made for the adjustability of the spring-rods by means of the set-screws *u*, to increase or diminish the tension, and the bent ends of the spring-rods entering through holes in the brackets.

Having now fully described my invention, what I claim as new, and desire to secure by Letters Patent, is—

1. In a cultivator, the combination, with an extensible arched axle and suitable handles hinged thereto, of a spring rod or rods connected to the axle and handles, to bring the handles back to their normal position when swung to one side, substantially as and for the purpose specified.

2. In a cultivator, the combination, with an extensible arched axle and clamps for holding the ends in their adjusted position, of a spring rod or rods connected to the axle by means of said clamps, and adjustably connected to handles or beams thereof, substantially as and for the purpose set forth.

3. In a cultivator, the combination, with the knives, plows, or other tools thereof having suitable shanks, of grooved and slotted boxes C, having recesses *d*, and the tapering blocks *e'*, with grooves *f*, substantially as and for the purpose set forth.

In testimony that I claim the above I have hereunto subscribed my name in the presence of two witnesses.

JOHN F. HALL.

Witnesses:
OLIVER OLSEN,
C. L. McLAY.